July 30, 1963 — C. S. IVORY, JR — 3,099,088

DENTAL MATRIX RETAINER

Filed July 19, 1962

INVENTOR.
CHESTER S. IVORY Jr.
BY

United States Patent Office 3,099,088
Patented July 30, 1963

3,099,088
DENTAL MATRIX RETAINER
Chester S. Ivory, Jr., Berwyn, Pa., assignor to J. W. Ivory, Inc., Philadelphia, Pa., a corporation of Pennsylvania
Filed July 19, 1962, Ser. No. 211,075
1 Claim. (Cl. 32—63)

This invention relates to a dental matrix retainer of the type shown in C. S. Ivory patent, No. 1,990,381, dated Febrruary 5, 1935.

The matrix retainer shown in said patent is operative and has been successfully made and sold over the years, but, as a result of research and experience, it has been discovered that the shape of the deciduous teeth is not the same as the shape of the permanent teeth. More specifically, the lingual and buccal walls of the deciduous teeth converge toward the masticating surface, while the same walls of the permanent teeth are substantially parallel.

Therefore, while the matrix retainer of the prior Ivory patent operated satisfactorily in connection with both types of teeth, it was found that when used to retain a matrix on deciduous teeth, the grip was not as steady and uniform as it was when the retainer was used on permanent teeth.

It is therefore a more specific object of this invention to provide a dental matrix retainer especially designed for use in connection with deciduous teeth.

The full nature of the invention will be understood from the following specification and drawings in which.

Figures 4, 5, 6:
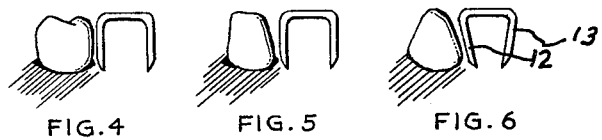
FIG. 4 is a diagrammatic illustration of the relation of the retainer of the Ivory patent No. 1,990,381 to an adult, or permanent lower tooth.
FIG. 5 is a diagrammatic illustration of the relation of the retainer of the Ivory patent to a deciduous tooth.
FIG. 6 is a diagrammatic illustration of the relation of the retainer of the present invention to a deciduous tooth.
Figure 1:
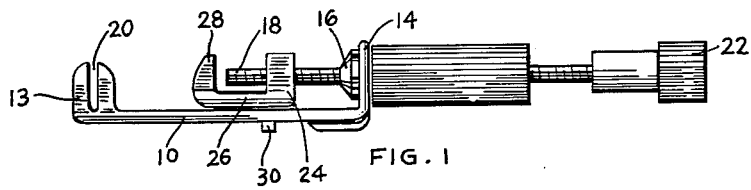
FIG. 1 is a side elevational view of a dental matrix retainer embodying the invention.

Broadly speaking, the only indispensible difference between the retainer of the Ivory patent and the present retainer is that the side walls of the Ivory patent are parallel and will abut the adjacent wall of a permanent tooth, as shown in FIG. 4, but will not abut the adjacent wall of a deciduous tooth, as shown in FIG. 5, whereas the side walls of the present retainer converge so as to abut the slanted wall of a deciduous tooth, as shown in FIG. 6. In other words, the present invention resides in converging the walls designated by reference numeral 12 which are best shown in FIG. 6 of the Ivory patent.

Since the structure and operation of the retainer can be exactly the same as that of the Ivory patent, the foregoing should suffice as a disclosure of the present invention. But, partly to make it unnecessary to refer to the Ivory patent for details of structure and operation, and partly because of slight structural differences, the structure of the present retainer will be described to the extent necessary for understanding the operation.

Figure 2:
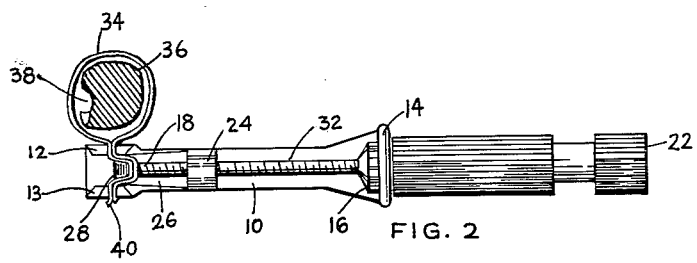
FIG. 2 is a top plan view showing the position of the parts when the matrix band is first loosely applied to a lower tooth.

As best shown in FIG. 2, the present retainer includes an elongated supporting bracket 10 which has converging end walls 12 and 13 at one end thereof and end wall 14 at the other end thereof. Wall 14 rotatably supports nut 16 which carries screw 18 and walls 12, 13 are vertically slotted, as at 20. Screw 18 is rotatable relative to nut 16 by a knob 22. Screw 18 threadedly engages wall 24 of a sliding cradle 26 and is adapted to abut wall 28 of the cradle. The cradle slides on supporting bracket 10 and is held against lateral displacement by a bottom T-shaped lug 30 which engages a slot in supporting bracket 10. Reference numeral 34 designates a matrix band which is adapted to be wrapped around a tooth 36 having a cavity 38.

Figure 3:
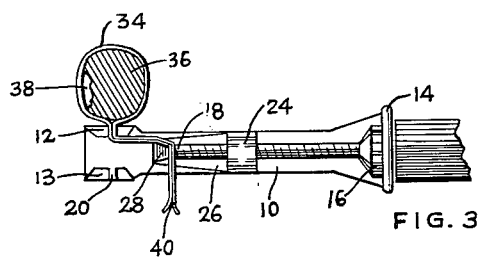
FIG. 3 is similar to FIG. 2 and shows the position of the parts after the matrix band has been tightened.

The operation is as follows:

The free ends 40 of the matrix band are passed through slot 20 in wall 12 (or in wall 13, depending on the location of the tooth) and between wall 28 of cradle 26 and the adjacent end of screw 18. For convenience, and to hold the ends of the band in place, they are also passed through slot 20 in wall 13. Knob 22 is then turned to cause screw 18 to clamp the ends of the matrix band tightly against wall 28 of the cradle and nut 16 is rotated in a direction to move cradle 26 to the right, or from the position of FIG. 2 to the position of FIG. 3. Movement of cradle 26 away from the tooth pulls the band tightly around the tooth and brings the corresponding slanted wall 12 or 13 into abutment with the similarly slanted wall of the tooth, as diagrammatically illustrated in FIG. 6. When the filling operation is completed, screw 18 is backed off to release the ends of the matrix band which can now be lifted off the tooth. To reset the retainer for another operation, nut 16 is rotated in a direction to move cradle 26 to the left, or to the position of FIG. 2.

From the foregoing, it will be seen that, the slight structural differences notwithstanding, the present matrix operates the same as that of the Ivory patent, except for the side walls 12 and 13 of the present invention which converge instead of being parallel, so that when the matrix band is pulled tight, the slanted wall 12 or 13 of the retainer will have good surface contact with the oppositely slanted surface of the tooth to provide firm contact without tilting the retainer or the band.

What I claim is:

A dental matrix retainer for use in the treatment of a tooth of the type having opposite side walls which converage from the gum line towards the cutting end of the tooth, said retainer including
    a flexible matrix band,
    an elongated bracket,
    a pair of flat fixed walls carried by the opposite longitudinal edges of said bracket,
    there being registering vertical slots in said walls through which said matrix band is threaded,
    a cradle slidable on said bracket,
    means for clamping the ends of said matrix band to said cradle, and
    means for moving said cradle away from said fixed walls to draw said matrix band through said slots,
    said fixed walls converging toward the longitudinal median line of said bracket.

References Cited in the file of this patent

UNITED STATES PATENTS

| | | |
|---|---|---|
| 1,661,068 | Gaillard | Feb. 28, 1928 |
| 1,990,381 | Ivory | Feb. 5, 1935 |
| 2,588,059 | Tofflemire | Mar. 4, 1952 |